July 10, 1956
H. A. BOTTENHORN
2,753,937
LEVER-OPERATED SHEARS
Filed Sept. 15, 1953
2 Sheets-Sheet 1
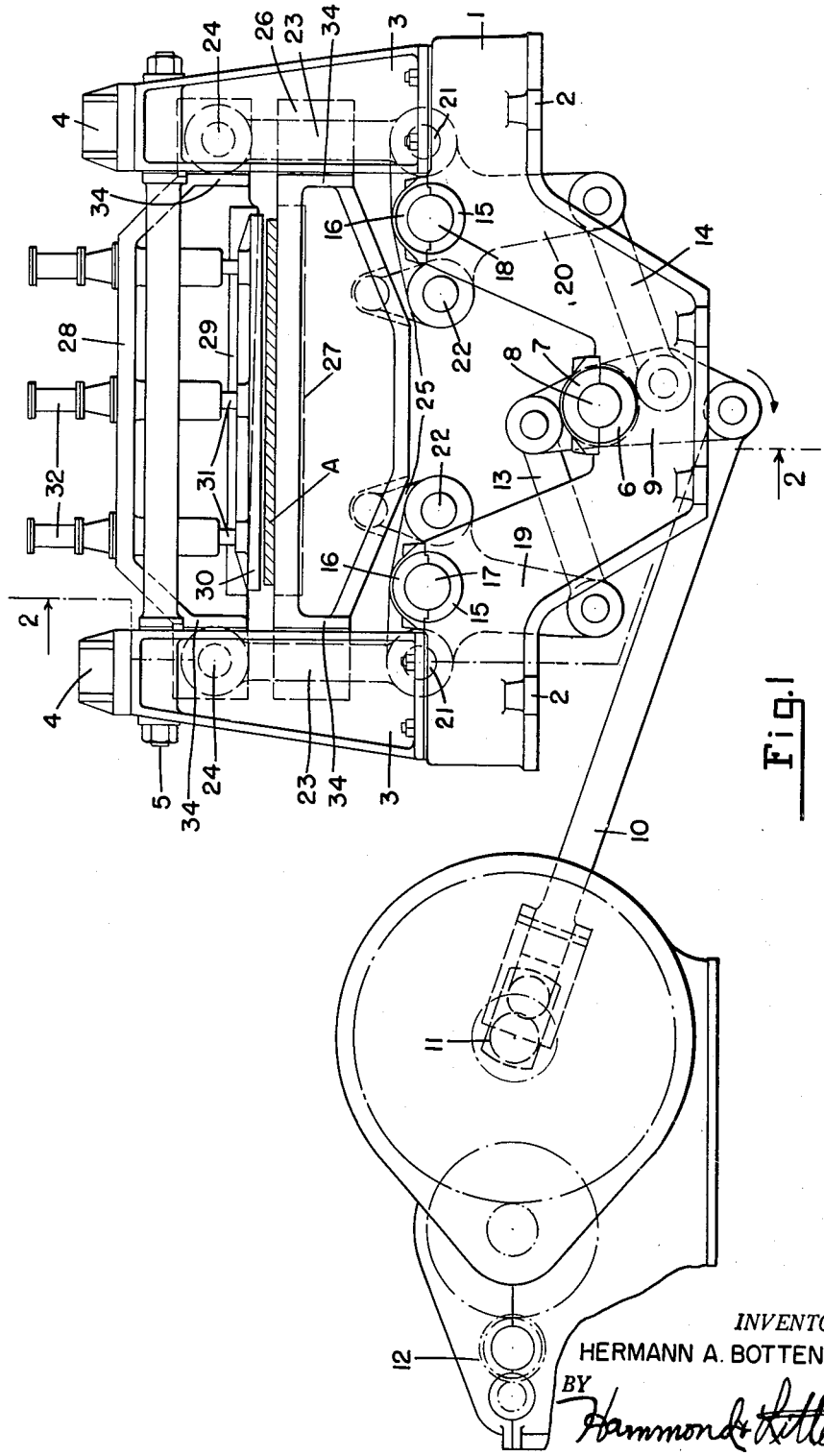
INVENTOR.
HERMANN A. BOTTENHORN
BY *Hammond & Littell*
ATTORNEYS July 10, 1956  H. A. BOTTENHORN  2,753,937
LEVER-OPERATED SHEARS
Filed Sept. 15, 1953  2 Sheets-Sheet 2
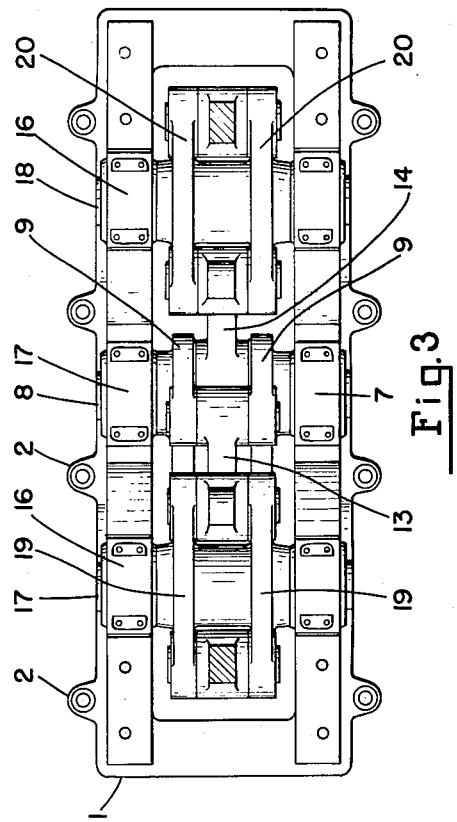
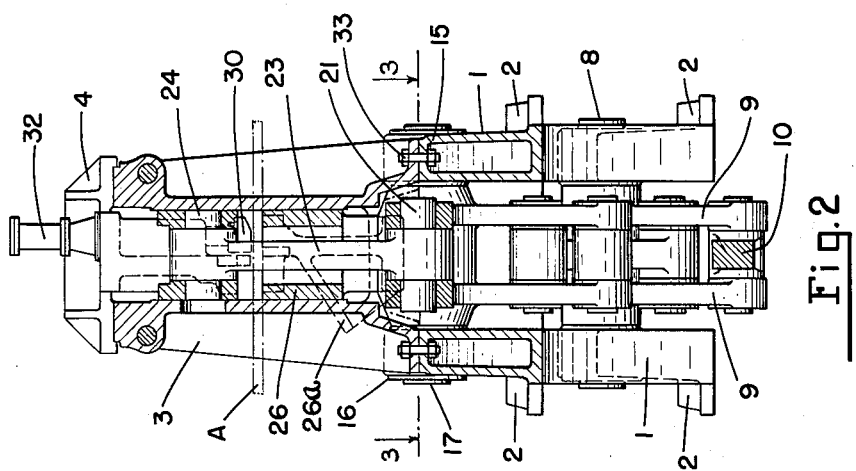
INVENTOR.
HERMANN A. BOTTENHORN
ATTORNEYS

United States Patent Office 2,753,937
Patented July 10, 1956

2,753,937
LEVER-OPERATED SHEARS

Hermann A. Bottenhorn, Little Neck, N. Y., assignor to Erwin Loewy, New York, N. Y.

Application September 15, 1953, Serial No. 380,277

6 Claims. (Cl. 164—47)

This invention relates to an improvement in cutting or slitting shears for metal slabs, plates, sheets, and the like, of substantial width and thickness.

The usual metal cutting shears having movable elements, such as cranks, pinions and racks, eccentrics, hydraulic cylinders, and the like, for actuating the shear blades have movement of one or both of the shear blades toward or away from each other, and are mounted in almost all instances so that the shear-housing or frame is subjected to substantial stresses by pull, pressure, or flexion by virture of the forces developed in the shearing action. This necessitates irregular sections in the housings and frames which make it necessary to produce complicated castings for the frames. Fractures of the frames due to irregular sections and to the strain thereon frequently occur in use and the resulting breakage of the machine seriously interferes with production.

This invention relates to a metal shear having a housing of susbtantial regular sections of substantial uniform thickness which is almost entirely relieved of stresses during the shearing operation.

It is one of the objects of this invention to provide a shear of simplified frame construction in which the shear blades are moved toward and away from each other by a system of pivoted levers whereby a minimum strain is imparted to the shear frame in the shearing operation.

Another object of this invention is to provide a shear frame of simplified construction which can be manufactured of relatively simple castings or forgings and which will provide a rugged shear construction in which fixed centers of rotation are provided in the frame of the shear-housing, which centers of rotation are not subjected to any substantial strain or stress by torsion during the shearing operation.

Another object of this invention is to provide a shear of simplified construction which is easy to assemble and provides a shearing system mounted in the frame which is essentially balanced in itself.

Various other objects and advantages of the invention will appear as this description proceeds.

Referring now to the drawings which illustrate one form of embodiment of my invention:

Fig. 1 is a side view, with parts shown in dotted line, of my improved shear construction.

Fig. 2 is a sectional view substantially on the line 2—2 of Fig. 1, also showing parts in dotted lines, and, Fig. 3 is a sectional view substantially on the line 3—3 of Fig. 2.

In the embodiment of the invention, shown for illustrative purposes in the accompanying drawing, the shear frame consists of a pair of V-shaped base members 1, adapted to be secured by bolts passing through lugs 2 to a suitable base. Four upright members 3 are mounted on the top of the lateral extensions of the V-shaped frame members 1 and are connected together by means of crossbars 4 and tie rods 5 so as to provide a rigid upper frame structure. The lower portion of the V-shaped members 1 are provided with journal bearings 6 on the vertical centerline thereof which cooperate with removable caps 7 to provide bearings for the axle 8 around which the primary rocker arms 9 rotate.

Similar rocker arms 9 are provided at each side of the shear and the rocker arms 9 are driven through a connecting rod 10, jounaled therebetween. The connecting rod 10 is driven by an eccentric 11 which may be driven by any suitable driving mechanism 12 to cause the connecting rod 10 to reciprocate and move the rocker arms 9 around the axle 8. Connecting rods 13 and 14 are connected between the rocker arms 9 at equidistant points from the axle 8.

The upper portion of the V-shaped frame members 1 are provided with journal housings 15 equally spaced from the vertical centerline of the V-shaped members 1 and having caps 16 to form journals for axles 17 and 18 of secondary bell crank levers 19 and 20, each consisting of a pair of duplicate members. Connecting rods 13 and 14 are also connected to bell crank levers 19 and 20 which rotate around the axles 17 and 18, and bell crank levers 19 and 20 are each provided with journals housing wrist pins 21 and 22 which are equally spaced from the center of the rotation of the bell crank levers 19 and 20.

Connecting rods 23 extend from the wrist pins 21 of the bell crank levers 19 and 20 and are connected with the upper shear blade beam 28 at pivots 24, and connecting rods 25 connect the wrist pins 22 of the bell crank levers 19 and 20 through pivoted connection to the lower shear blade beam 26 for the lower shear blade 27. The beam 28 of the upper shear blade extends between the columns 3 and is slidably mounted thereon, and the upper shear blade 29 is mounted on this beam and moves up and down therewith.

In operation when reciprocatory motion is transmitted to connecting rod 10 it will cause the rocker arms 9 to move back and forth around the axle 8. Movement in a clockwise direction, as indicatd by the arrow at the bottom of Fig. 1, will be transmitted through the rocker arms and connecting rod system just described above to move the upper and lower beams and upper and lower shear blades toward each other, and movement in a counterclockwise direction will cause the upper and lower shear blades to move away from each other. In a shearing action when the eccentric 11 causes movement of the connecting rod 10 to the left, as indicated in Fig. 1, the connecting rod 14 will likewise move to the left to cause the bell crank levers 20 to move in a clockwise direction around their axis 18. This will pull connecting rod 23 connected with upper shear beam 28 downward and push connecting rod 25 connected to the lower shear beam upward. The same movement will move connecting rod 13 toward the right, as indicated in Fig. 1, to move the bell crank levers 19 in a counterclockwise direction around their axis 17, which will likewise transmit a downward movement through connecting rod 23 to the upper shear beam 28 and an upward movement through connecting rod 25 to the lower shear beam 26.

But for the linkages described the pairs of rocker arms 9 and bell crank levers 19 and 20 are free to move around their respective pivots, and the forces exerted on the pivots are substantially equalized by the fact that the connecting rod 13 and 14 are equally spaced from the axis of the rocker arms 9 and connecting rods 23 and 25 are equally spaced from the axes of the bell crank levers 19 and 20. In this way, the forces exerted during the shearing action are substantially equalized and are absorbed by the relatively free floating mounting on the beams for the lower and upper shear blades 27 and 29 in the shear frame and the axes for the rocker arms 9 and bell crank levers 19 and 20, so that a minimum of stress is imparted to the frame during the shearing operation.

A holding foot 30 is mounted in the upper shear beam 28 by means of pistons 31 slidable in cylinders 32. The pistons may operate against spiral springs, or the like in cylinders 32. When the upper shear beam 28 is moved downward, the foot 30 first makes contact with the piece A to be sheared and holds it firmly against the lower shear beam 26, further movement of the shear beams 26 and 28 toward each other then compresses the springs in cylinders 32 and the shear blades 27 and 29 are brought closer together to shear the piece A. A diagonal shield 26a on the lower shear beam 26 deflects the sheared piece away from the machine.

By virtue of the simplified construction of the frame members, portions of irregular thickness are avoided and a more uniform frame structure is provided. The columns 3 are bolted on the V-shaped lower frames, as indicated at 33, and the upper and lower shear beams 28 and 26 extend between the columns 3 and are provided with vertical surfaces 34 adapted to slide upon similar vertical surfaces of the columns 3 to keep the shear beams in proper alignment.

While I have illustrated and described a preferred embodiment of my invention, it will be understood that various modifications and changes may be made therein without departing from the spirit of my invention or of the scope of the following claims.

I claim:

1. In a shear of the type described, a pair of spaced frame members, upper and lower shear beams movable vertically between said frame members, a main axle extending between said frame members, rocker arms movable about said main axle, means to move said rocker arms to impart relative vertical movement to the upper and lower shear beams, a pair of spaced secondary axles extending between said frame members, secondary bell crank levers movable around said secondary axles, means equally spaced from the center of rotation of said secondary bell crank levers pivotally connecting one arm of the secondary bell crank levers with the upper shear beam and pivotally connecting the other arm of the secondary bell crank levers with the lower shear beam and means equaly spaced from the center of rotation of said rocker arms pivotally connecting the secondary bell crank levers with said rocker arms whereby movement of said rocker arms around their axis will cause movement of the secondary bell crank levers around their axes to move the shear beams toward and away from each other.

2. In a shear of the type described, a pair of spaced frame members, upper and lower shear beams movable vertically between said frame members, a main axle extending between said frame members, a pair of rocker arms movable about said main axle, means to move said rocker arms to impart relative vertical movement to said upper and lower shear beams, a pair of spaced secondary axles extending between said frame members, two pairs of secondary bell crank levers movable around said secondary axles, connecting rods pivoted adjacent the ends of said secondary bell crank levers at equidistant points from the centers of rotation of said secondary bell crank levers and pivoted to the upper and lower shear beams, connecting rods connecting each pair of secondary bell crank levers with the pair of rocker arms at points equally spaced from the center of rotation of said rocker arms whereby movement of the rocker arms around their axis will cause movement of each pair of secondary bell crank levers around their axes to move the shear beams toward and away from each other.

3. In a shear of the type described, a pair of spaced frame members, upper and lower shear beams movable vertically in said frame members, a main axle extending between said frame members, a rocker arm movable about said main axle, means to move said rocker arm to impart relative vertical movement to the upper and lower shear blade beams, secondary axles spaced on each side of and above the main axle, a secondary bell crank lever movable around each of said secondary axles, means equidistantly spaced from the centers of rotation of said secondary bell crank levers pivotally connecting the secondary bell crank levers with the upper and lower shear beams, and means equally spaced from the center of rotation of said rocker arm pivotally connecting the secondary bell crank levers with the rocker arm whereby movement of the rocker arm around the main axle will cause movement of the secondary bell crank levers around their axles to move the shear beams toward and away from each other.

4. In a shear of the type described, a pair of spaced frame members, upper and lower shear blade beams movable vertically in said frame members, a main axle extending between the frame members, rocker arms movable about said main axle, means to move said rocker arms to impart relative vertical movement to said shear blade beams, a pair of spaced secondary axles and secondary bell crank levers movable around said axles, connecting rods pivotally connecting the secondary bell crank levers with the upper and lower shear blade beams, said connecting rods being pivoted to the secondary bell crank levers at equidistant points from the center of rotation of said secondary bell crank levers, and connecting rods connecting the secondary bell crank levers with the rocker arms, said latter connecting rods being pivoted to the rocker arms at equidistant points from the center of rotation of the rocker arms whereby movement of the rocker arms around their axis will cause movement of the secondary bell crank levers around their axes to move the shear beams toward and away from each other.

5. In a shear of the type described, spaced frame members, upper and lower shear blade beams movable vertically in said frame members, and means to move the upper and lower shear blade beams toward and away from each other, comprising connecting rods pivoted at one end to the upper and lower shear blade beams and pivoted at the other end to secondary bell crank levers at points equidistantly spaced from the axles of said secondary bell crank levers, said secondary bell crank levers being movable on axles mounted between the shear frame members, a rocker arm pivoted between the shear frame members, connecting means connecting said rocker arm and said secondary bell crank levers, said connecting means being equally spaced from the center of rotation of said rocker arm, and means to move the rocker arm around its axis to cause movement of the secondary bell crank levers around their axes and movement of the shear blade beams toward and away from each other.

6. In a shear of the type described, spaced frame members, upper and lower shear blade beams movable vertically in said frame members, and means to move the upper and lower shear blade beams toward and away from each other, comprising connecting rods pivoted at one end to the upper and lower shear blade beams and pivoted at the other end to secondary bell crank levers movable on axles mounted in the shear frame, said connecting rods being equally spaced from the center of rotation of the secondary bell crank levers to which they are pivoted, connecting rods connecting said secondary bell crank levers with a rocker arm to move the secondary bell crank levers around their axles, said latter connecting rods being equally spaced from the center of rotation of the rocker arm and means to move the rocker arm around its axle to cause movement of the secondary bell crank levers around their axles and movement of the shear blade beams toward and away from each other.

References Cited in the file of this patent

UNITED STATES PATENTS

| Number | Name | Date |
|---|---|---|
| 19,413 | Duchamp | Feb. 23, 1858 |
| 238,518 | Morrison | Mar. 8, 1881 |
| 425,846 | Atha | Apr. 15, 1890 |
| 435,212 | Deane | Aug. 26, 1890 |
| 475,931 | Chapin | May 31, 1892 |
| 509,989 | Wilton | Dec. 5, 1893 |
| 905,282 | Bragg | Dec. 1, 1908 |
| 2,059,368 | Kruttschnitt | Nov. 3, 1936 |
| 2,211,864 | Schmied | Aug. 20, 1940 |
| 2,311,452 | Maurer | Feb. 16, 1943 |